Oct. 28, 1941.    R. E. MARINE    2,260,326
AUTOMOBILE LOCK
Filed July 29, 1932    2 Sheets-Sheet 1
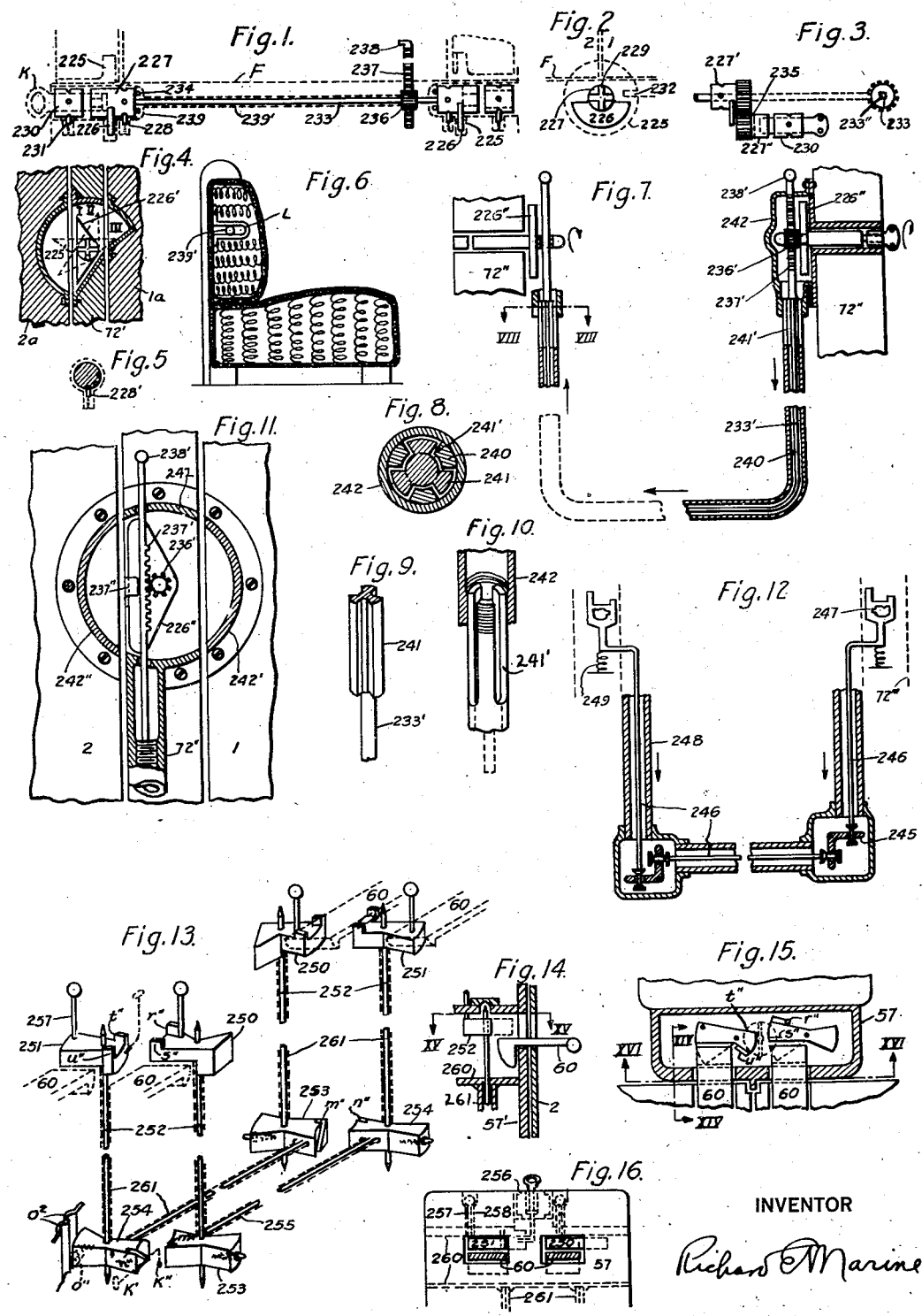
INVENTOR
Richard E Marine Oct. 28, 1941.   R. E. MARINE   2,260,326
AUTOMOBILE LOCK
Filed July 29, 1932   2 Sheets-Sheet 2
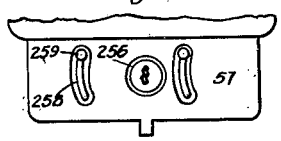
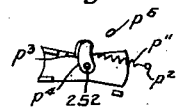
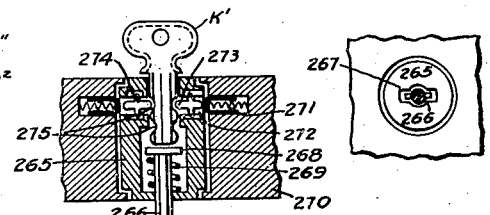
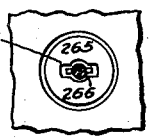
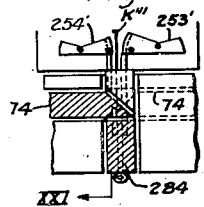
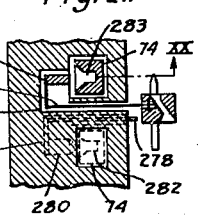
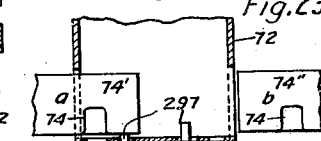
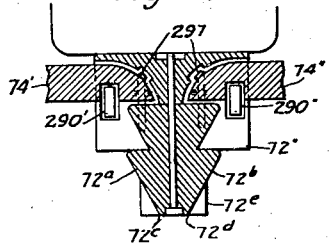
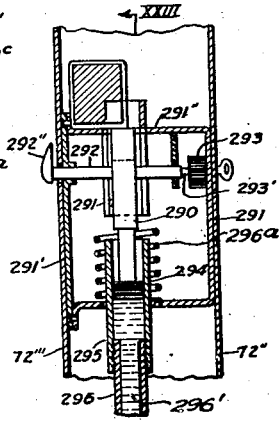
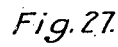
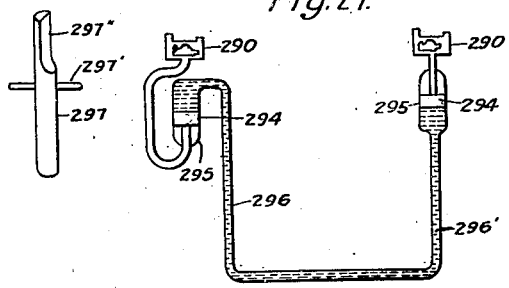
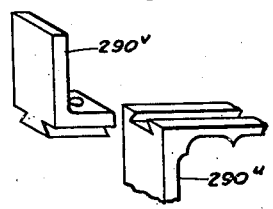
INVENTOR
Richard E Marine Patented Oct. 28, 1941

2,260,326

UNITED STATES PATENT OFFICE 2,260,326

AUTOMOBILE LOCK

Richard E. Marine, Pittsburgh, Pa.

Application July 29, 1932, Serial No. 625,937

19 Claims. (Cl. 70—264)

My invention relates to locking systems primarily designed for use in automobiles, or analogous uses, where special conditions exist which have precluded the idea of modifying and adapting known locking systems employed in non-analogous situations to the new situation.

The automobile body is subject to twisting strains, vibration, and shocks, and any locking system used therein must be rugged, while, because of the limited space available and the restrictions as to location, it must also be small and adapted to accommodate itself to its exacting environment. It must also be a system of small inertia and delicate, though positive and certain in its operation, because the ordinary automobile key which is continuously carried by its owner with many others in every-day use, must necessarily be small and incapable of operating a system of large inertia, such as may be operated by the larger keys and levers used in doors of stationary and similar structures.

It has heretofore been proposed to operate both doors on the same side of the vehicle from a single latch-operating mechanism located on the stationary body post between the doors and to apply to the latching mechanism a locking mechanism necessarily small, but adapted to lock the latches of both doors by the operation of a single key. This system has the defect that an operating handle for the latches has to be supplied on the stationary body post in addition to the door handles for opening and closing the respective doors. The operator must therefore employ both hands in performing the operations essential to the opening of a door.

My invention contemplates a locking system wherein both doors on the same side of the vehicle are simultaneously locked by a single key operation but in which each door may be provided with the usual latch mechanism located on the door itself and operated by the door handle so that, when unlocked, each door may be opened and closed by the operation of a single handle, requiring the use of only one hand.

My invention further contemplates a locking system whereby the doors on the opposite sides of a vehicle may be simultaneously locked from a single point by a single key operation, whether there be a single door on each side, or two or more doors on each side. Thus, where prior systems usually required, for a four door car, four separate operations and the passing of the operator from one side to the other, frequently in danger of traffic, to completely lock the car, in many cases forgetting to lock one of the doors, my system enables the car to be completely locked by a single operation and from a single point out of range of the traffic and with no danger of forgetting a door.

Where two doors are employed on each side, my invention effects the simultaneous locking and unlocking of both rear doors, only, if desired, the front doors remaining unlocked, as where it is wished to protect children or baggage in the rear portion of the car; or, optionally, my invention effects the simultaneous locking and unlocking of the front doors, alone, or of all four doors, from a single key operation.

My invention also contemplates the locking or unlocking of the doors, optionally, from either side of the vehicle, exteriorly or interiorly, regardless of the point at which the prior locking or unlocking was performed.

Inasmuch as my system is necessarily extensive and difficult to operate with the usual small key, or like secret lock means, unless designed with small inertia, my invention further contemplates the reduction of the inertia of the system, as by constructing and locating the parts so that the motion imparted to them by the key, or the like, will not be opposed to the force of gravity, or by balancing one part against the other so that the resulting effect of gravity is substantially zero, or by the use of springs to counteract the influence of gravity. I further eliminate, as far as practicable, friction between relatively moving parts.

Inasmuch as such a system requires delicate adjustment and balance which for successful operation must be maintained at all times, notwithstanding the stresses and strains incident to the exacting conditions of road travel, accident, etc., my invention further contemplates locating the system in a protecting casing, such as a tubular frame in which the parts are assembled and mounted, the frame being preferably rigidly connected to the car body only at its ends, containing or adjacent to the locks. Such a system then becomes a self-contained unit which may be set up and adjusted at the factory and easily attached to the car body in the assembly line and is free from the ordinary stresses, strains, and vibrations of the car body.

My invention further contemplates the construction of a self-contained locking system of the character indicated which may be simply attached to existing cars without substantial modification of the latter.

Where the locking mechanism becomes far removed from the point of insertion of the key, in order that the key may not be of undue size and length, rendering it impracticable for its purpose, my invention further contemplates a "key extension" or key part which permanently remains in the lock but is only actuatable by the insertion and operation of the usual key.

My invention further contemplates the provision of means to prevent locking any of the doors if all of the doors are not closed—thus insuring against inadvertently leaving a door open when the others are locked and also avoiding possible damage to the locking system by attempting to close a door after locking the other doors.

Since my special type of locking mechanism contemplates the possibility of locking the doors to the bottom frame of the car body it operates to prevent premature opening of the doors in case of accident or undue strain which might wrench the usual lock or latch from the center of the body post, which is its customary location. It also operates to prevent the prying of the post away from the lock by a thief, which is a common occurrence and is much more effective than the ordinary handle lock in repelling his attempts to break into the car. Its location also removes the danger of soiling the clothing of passengers, with any grease that may be placed in the lock.

My invention in its broadest aspect, however, is extremely flexible and permits the use of as many locks as is desired to be operated from a single point by a single key operation. It permits also their locations, respectively, at any desired points in the car. Thus the locking system may be extended to include, in addition to the doors, the ignition or transmission locks, or both. In other words, my invention, in some of its forms at least, makes a single key operation effective for all of the locks of the entire car.

My invention further consists in such other new and useful improvements, and has for further objects such other operative advantages and results, as obtain in the constructions, and their equivalents, hereinafter described or claimed.

In the accompanying drawings, forming a part of this specification, and showing for purposes of exemplification preferred forms and manners in which the invention may be embodied and practiced but without limiting the claimed invention to such instance or instances:

Fig. 1 is a side view of one form of my locking system showing the positions of adjacent parts of the car bottom, doors, and lock casing, in dotted lines, and Fig. 2 is an end view of the same, with key barrel removed.

Fig. 3 shows means for maintaining the same direction of rotation of the key, for the same operations, on the opposite side of the car.

Fig. 4 shows a slightly modified form of the same locking system adapted for use on the conventional body post, intermediate of the doors; and Fig. 5 shows the detent arrangement for the system of Fig. 4, while Fig. 6 shows the cross-rod of the same locking system and its protecting tube, passing through a slot in the seat-back of an adjustable front seat.

Fig. 7 shows, partly in section, a modified system in which the locks on opposite sides are elevated above the floor and are connected down the sides and across the floor or under the seat; Fig. 8 is a cross section on line VIII—VIII of Fig. 7, and Figs. 9, 10, and 11 show details of parts thereof.

Fig. 12 shows a further modification in which springs are employed to neutralize the effects of gravity.

Fig. 13 is a diagrammatic perspective view of a modified form of balanced locking system; Fig. 14 is a section showing a detail on the line XIV—XIV of Fig. 15; Fig. 15 is a section showing a detail on the line XV—XV of Fig. 14; Fig. 16 is a section on the line XVI—XVI of Fig. 15 showing the intermediate body post between the doors, as terminating at the level of the top of the car sides just above the locks; and Fig. 17 is a top plan view of said post.

Fig. 18 is a section of a key barrel, showing the principle of my key extension; and Fig. 19 is a bottom plan view, partly in section, of the same.

Fig. 20 is a fragmentary horizontal section on the line XX of Fig. 21 showing the locking system of Fig. 13 adapted to the conventional door latch; Fig. 21 is a fragmentary vertical section on line XXI of Fig. 20; and Fig. 22 shows a modified form of biasing device for the locking elements of Fig. 13.

Fig. 23 shows a longitudinal vertical section, taken on the line XXIII of Fig. 24, Fig. 24 a transverse vertical section, and Fig. 25 a horizontal section, of a further modified form of my invention employing a fluid for transmitting motion from one lock to another to obtain their synchronous operation; Fig. 26 shows one expedient in such a system for preventing operation of the locks until all doors are closed; and Fig. 27 shows diagrammatically the fluid transmission system, as a whole; Fig. 28 shows means for adjusting the lock member of this system to various widths of posts, and Figs. 29 and 30 show modified forms of locking members adapted for use in this system.

Referring to the drawings, there is shown in Figs. 1 and 2 a circular pocket 225 formed in part in the lower adjacent corners of the doors 1, 2 and in part in the floor F of the car immediately beneath said doors, and extending longitudinally of the car. In this pocket is located the locking element which may conveniently be a semi-circular plate or disk 226 rotatably mounted on a key-operated barrel shaft 227 provided with suitable detents 228 adapted to yieldingly hold the barrel shaft in any one of a plurality of positions, shown as four in number. In the outer face of the barrel shaft are shown two kerfs 229 at right angles to each other. In front of and in rotative alignment with the barrel shaft is preferably a key barrel 230 of convenient type operable only by a key of proper design and provided with detents 231 adapted to yieldingly hold the barrel in one of several definite positions, corresponding to those of the barrel shaft 227. If desired, combined detents and locking elements as subsequently disclosed herein (Fig. 18) may be employed for the barrel 230. The proper key K inserted in the barrel 230 extends across the gap between the barrel and the barrel shaft and into the kerf of the latter that happens to be aligned therewith. Introducing this key unlocks the barrel 230 permitting the key and barrel to turn. When the disk is in the position shown in Fig. 2 the doors are unlocked. If the key be turned clockwise one quadrant or 90°, the rear door only is locked. If it be turned two quadrants or 180°, i. e. until its motion is arrested by the stop 232, both doors are locked. A similar locking mechanism may be provided for the doors on the opposite side of the car and since the barrel shafts 227 on the respective sides are in rotative alignment with each other, they may be made parts of a single integral shaft 233, preferably reduced between its ends and provided with ball-bearings 234 to facilitate turning. With this arrangement it becomes possible to lock both rear doors or, if desired, all four doors by the same operation and from either side of the car. In order to effect automatic adjustment of the position of the locking disks 226 with respect to the pockets 225 for variations in the distance between the respective pockets, at least one of the barrel shaft members 227 is preferably slidingly but non-rotatably mounted on the shaft 233, as shown for instance in Fig. 3 in which one end 233' of the shaft is shown as squared and the corresponding barrel shaft 227 is shown as provided with a concentric squared opening 233" through which the squared end of the shaft freely but non-rotatably passes. If it be desired that the locking operation be performed by turning the key with the same right hand or clockwise motion on each side of the car, the barrel shaft member 227 may be divided into an inner part 227' and an outer part 227" connected by gear 235, the outer part being provided with the key kerfs. In order that the locking mechanism may be operable from the inside without the necessity of using a key, the shaft 233 is preferably provided at an appropriate point with a pinion 236 capable of being actuated by a sliding rack 237 having an operating handle 238 located at any point convenient to the operator, or a plurality of such operating racks and pinions located at various convenient points in the car may be provided. Preferably the locking system is enclosed in end casings 239 rigidly connected together by an intermediate tube or casing 239' conveniently located in or on the floor. The whole casing structure serves to protect the locking system from all deleterious influences, strains, etc. In this connection it is to be observed that the shaft carries no substantial part of the strain to which the door locks may be subjected, this being borne for the most part as a shearing strain by the disks 226 and pockets 225.

In Fig. 4 my improved locking system is shown applied to a car provided with a panel or post 72' between the free edges of the front and rear doors 1ᵃ and 2ᵃ. Here the pocket 225' is located in part in the two doors and in part in the panel and the lock member 226' may be made to occupy position I in which both doors are unlocked, the position II in which both rear doors only are locked, or position III in which all doors are locked. The spring detent arrangement for such a system is shown at 228' in Fig. 5. In this case the shaft may be raised above the floor being conveniently passed through the back or bottom of the front seat. In case the seat back is adjustable it may be provided with an elongated slot L, Fig. 6, for the accommodation of the lock shaft in all positions of seat back adjustment.

The key barrels 230 may be made integral with their barrel shafts 227, respectively, the detents 228 being omitted and four detents 231 at right angles to each other being used, the detent recesses in the barrel 230 in the plane of the key being made locking recesses, as in Fig. 18 hereinafter described. The barrel may thus be locked in any vertical or horizontal position and the position of the key slot will indicate which of the doors, if any, are locked. A pointer could be applied to the barrel for the same purpose.

In Figs. 7 to 11 is shown a construction whereby the locking members 226" on opposite sides of the car body may be interconnected by means confined to the enclosing structure of the body passing down the sides of, or through, the body posts 72" and across, through, or around the bottom of the car, in fact, in any convenient, out of the way position. This construction is shown as comprising a pinion 236' engaging a rack 237', having a manually operable knob 238' at its upper end to permit operation from the inside of the car, the rack 237' being backed by an aligning member 237" and integrally attached to a transmitting member 233', such as a spring brass wire, which while sufficiently flexible to slide around the bends in the tubular casing 240 without material friction, is sufficiently rigid longitudinally, when sliding within the casing, to transmit any force required for performing the locking and unlocking operation. In order to prevent the ends of the transmitting member 233' from flexing when they move out of the tubular casing 240, these ends have integrally attached thereto fins 241, which freely ride in corresponding slots 241' in the upper end of the tubular casing. It is obvious that the fin and slot arrangement may be replaced by a tongue and groove arrangement if it is desired to keep the upper ends of the tubular casing continuous on its outer circumference for connection, as by screw threads, to the lock casing 242. This casing and its associated door parts 242' and 242" are shown so constructed as to be readily attachable to existing body posts 72" and doors 1 and 2, without substantial alteration therein. It is obvious, however, that the system may be built within the body posts, doors and bottom.

In Fig. 12 is shown a system of levers 245 and rods 246 for interconnecting locking members 247, of a type more fully described in connection with Fig. 23, these members being located in body posts 72". The entire system is delicately mounted in casing 248 and springs 249 are provided which are designed to neutralize the weight of the vertical rods 246, being placed under greater tension when these rods are lowered so as to give an initial impetus to them when they are being raised. If one of the locking members 247 be designed to operate in reverse direction to the other, the levers 245 may be arranged in an obvious manner to cause the vertical rods 246 to move in opposite directions and thereby balance each other.

In Figs. 13 to 19 is shown a modified interlocking system for effecting the same sequence of locking operations as in Figs. 1 to 4, i. e. the locking of both rear doors only by a single operation, or all of the doors by a single operation from a single point on either side of the car or from its interior. It differs from the preceding system in that the locking action is applied to the door latches 60 (Fig. 13) rather than to the door structure itself. To this end there is provided a pivoted locking element 250 or 251 for each of the latches, adapted to assume the unlocked position shown in full lines in Figs. 13, 14, and 15 or the locking position over the latch, thereby preventing raising of the latter to release it from the locking plate 57', as shown in dotted lines in Figs. 14 and 15. Each locking element 250, 251 is preferably exactly balanced on its vertical pivot shaft 252 by causing the geometric axis of said shaft to pass through the center of gravity of its corresponding element; and each shaft is provided at its lower end and conveniently in the floor of the car with an actuating element 253 or 254 also preferably exactly balanced on the shaft in a similar manner. The actuating elements 253 and 254 have their inner ends adjacent each other, separated by a space just sufficient for their operation by a common key inserted between them as shown diagrammatically in dotted lines at K' in Fig. 13. The faces of the element 253, 254 are each shown as provided with grooves $m''$, $n''$ respectively of a size to accommodate the end K'' of the key, said grooves each sloping from the top outer corners of its corresponding face to the bottom inner corner thereof. In the unlocked position, the lower inner corner of the groove $n''$ lies in substantially the same vertical plane parallel to the longitudinal axis of the car as the top of the groove $m''$ as shown in Figs. 13 and 15. The actuating elements are shown as yieldingly held in unlocked or locked position, as the case may be, by the spring detents $o''$ in engagement with suitable stationary recesses $o^2$ (Fig. 13), or they may be biased either to locked or unlocked position by the arrangement shown in Fig. 22 in which a spring $p''$ is attached at one end to a fixed point $p^2$ and at the other end to a point $p^3$ on the actuating element, being carried around the shaft 252 by a rigid frame member $p^4$, stops to limit the throw of the element being provided at $p^5$, the spring passing through the deadpoint of the pivot substantially half way between the stops. The actuating elements 253 on one side of the car are connected by links 255 to the actuating elements 254 on the opposite side of the car, being freely pivoted therein at their ends.

To operate the system, assuming that the doors are unlocked and it is desired to lock them, the key K' is inserted until its end K'' lies adjacent the lower far end of the groove $n''$. It is then turned clockwise 180 degrees, its end K'' riding in the groove $n''$ and by cam action turning the shaft actuating element 254, and with it its shaft, to throw the locking element 251 over its corresponding latch 60 to lock the same against removal from its engagement with the locking plate 57' (dotted line position, Figs. 14 and 15). Simultaneously the corresponding link 255 will throw the locking element 250 on the opposite side of the car into locking position with reference to its latch 60, thus securely locking both rear doors. If the turning of the key be now continued still in clockwise direction its end K'' will first take into the top of the groove $m''$ and will then by cam action turn the actuating element 253 and with it its shaft to throw the locking element 250 into locking position over its latch 60. Simultaneously the corresponding link 255 will throw the locking element 251 on the opposite side of the car into locking position over its latch 60 and all doors of the car will be locked. To unlock them the reverse operation is performed, that is, the key is turned in anti-clockwise direction. Both front and rear doors may therefore be locked and unlocked in pairs from a single point on either side of the vehicle and by a single operation. Moreover, the rear doors may be left locked while the front are unlocked and vice versa. To this end it is desirable to construct the key barrel so that the key may be withdrawn or inserted and operated from either one of two positions located 180° apart.

There is also provided means for unlocking the door from the interior. For this purpose the locking elements 250 and 251 may be provided with upstanding projections or lugs $r''$, $s''$, and $t''$, $u''$ respectively, while a vertically disposed key barrel 256 as shown in Figs. 15, 16, and 17 is located immediately above and between them, in the top of the post 57. When the locking elements are in the unlocked position shown in Fig. 15, and the key is inserted with its end member K'' toward the bottom of the sheet and turned clockwise, it first engages the lug $t''$, throwing the locking member 251 into locking position to lock the rear doors, and if it is further desired to lock the front doors, rotation clockwise is continued, the end member K'' engaging in turn the lug $s''$ and throwing the locking member 250 into locking position to lock the front doors. Anticlockwise rotation of the key causes its end member K'' to engage the lugs $r''$, $u''$ in sequence, the lugs $s''$, $t''$ having been moved out of its path in the locking operation.

It will be observed that the pivotal points of the locking members and the direction of inclination of the grooves in their faces have been specially so designed that clockwise rotation of the key will always effect a locking and anticlockwise rotation an unlocking on both sides of the car, unless these conditions already exist, but it is obvious that the parts may be designed to modify this sequence of operations in any desired manner.

As an emergency expedient or as an additional mode of operating, the locking members each may be provided with a rigid upstanding rod or post 257, operating in slots 258, and provided with knobs 259 by means of which each may be manually turned either to locking or unlocking position. It is understood that these several expedients may be provided if desired in each of the posts 57 on opposite sides of the car to render more convenient the locking and unlocking operations. Each of the adjacent pairs of locking and actuating elements are advantageously contained in a protecting casing 260 (Fig. 14), these casings being connected by tubular members 261 surrounding the respective inter-connecting shafts and links 252, 255. The entire system of connected casings and tubular members are preferably suspended or fixed at its upper end only, whereby the system is relieved of all body strains tending to throw it out of adjustment. The shafts are preferably pointed and mounted in well adjusted bearings to render key operation of the entire system easy and the balanced locking elements 250, 251 turn out of contact with the casings and latches and are designed to individually bear any pressure imposed upon them by the attempt of the latches 60 to lift, such attempts merely lifting the locking elements and their shafts until the former engage the tops of their casings.

As it is frequently necessary for the key actuating end member K'' to extend inwardly some distance, for instance beneath a door as in Fig. 13, which would necessitate the use of an inconveniently long key or a folding or telescopic key, I have devised a special key barrel construction carrying permanently a key extension which is only rendered operative by the insertion of the proper key which itself may be made of the usual convenient length. This construction is shown in Figs. 18 and 19 wherein are shown the key barrel 265 provided non-rotatably with a flattended key extension shank 266, passing through a slot 267 in the bottom of the barrel, said shank having a head 268 and an actuating end member K''. A spring 269 is provided between this head and the bottom of the barrel to normally retract the extension its full length into the barrel chamber. The casing 270 surrounding the barrel is provided with spring pressed plungers 271 normally taking into the openings 272 in the barrel and thereby locking the same against rotation. The barrel is provided in these openings with tumblers 273 suitably retained and guided therein as by pin and slot connection 274. When the proper key K' is fully inserted, the tumblers 273 are pressed outwardly just sufficiently to cause both their ends and the ends of the plungers 271 to be in alignment with the circumference of the barrel, thus permitting it to be turned by the key. The insertion of the key also forces the head 268 and shank 266 downwardly, carrying the actuating end member k'' into operative position, it being subsequently turned by turning the key carrying with it the barrel. In some cases it may be necessary to preliminarily turn the end member K'' through a given angle and past an obstructing part before reaching its initial position, as where one of the actuating elements 253, 254 has been turned from the opposite side, out of proper position relative thereto. To effect this result I provide a duplicate pair of recesses 275 in the side edges of the key so that the key may be partially extracted until the end recesses engage the tumblers 273 when the barrel may be turned as before, but simultaneously the shank and its end member K'' are retracted sufficiently to avoid interference by the obstructing part. After it has been turned past such part the key K'' may be pushed in full length to restore the end member K'' to operative position, from which it may be subsequently turned to actuate the locking mechanism in the manner desired. If it is desirable to further provide against tampering with the locking mechanism, an additional pair or additional pairs of recesses, each pair preferably of a different depth from that of the other pairs, with corresponding detent mechanisms, may advantageously be provided in the key and barrel respectively.

It will be observed that my lock and latch system differs essentially from the conventional systems in that it locks the car to the door, as it were, rather than the door to the car, and the arrangement has the distinct advantage over the conventional systems that it is impossible for the latch 60 to become disengaged or pulled out of its latch plate socket when the car body is strained. Moreover, my locking elements 250, 251 when in locking position positively preclude the untoward opening of the doors even in the case of greatest strain due to accident or otherwise.

Where the car construction permits, it is obvious that the key grooves m'', n'' may be located in the faces of the locking elements 250, 251, operable from either the inside or outside of the car.

My system may, for instance, be adapted to the usual arrangement in which a body panel or post intervenes between the doors, as shown in Figs. 20 and 21. Here, I conveniently provide actuating elements 253', 254' at an elevation intermediate the sliding latches 74. The intermediate panel or post is provided with passages 276, 277 in which slide connecting rods 278, 279 pivoted at their inner ends respectively to the actuating elements 253', 254' and carrying as offsets at their opposite ends locking bolts 280, 281 adapted when the actuating elements 253' and 254' are operated by the key K''' to slide into the recesses 282, 283 in the respective latch members 74 and thereby lock them against retraction. A key-hole 284 is provided in the body panel or post between the latches which latter are shown as at different vertical heights and if desired, the space between them may be increased to permit of the use of the key barrel extension mechanism shown in Fig. 18.

In Figs. 23 to 27, I have shown a further modified form of lock member 290 provided with lock bolts 290', 290'' of different length, adapted to engage recesses 74ª, 74ᵇ in door latches 74' and 74'' which in turn engage keepers 72ª, 72ᵇ in body post 72'' intervening between the doors, the inner side 72''' of the post being conveniently formed as a separate plate preferably removably attached in an appropriate manner to the main portion of the post to permit ready assembly of the locking mechanism. The locking mechanism, proper, is advantageously contained within a lock casing 291, provided with a removable side 291' and top 291'', provided with apertures, as shown, for passage of the lock bolts 290' and 290''. The lock member or plate 290 slides in guides 291'''' on opposite sides of the casing and is provided with an aperture 290''' having biasing recesses 290ª, 290ᵇ, and 290ᶜ adapted to be engaged by cam or key member 292' on key shaft 292, operable by handle 292'', from within the car, or by a key 293' applied to the key-barrel 293, from without the car, as in Fig. 1. In order to permit sufficient extension of the latches 74' and 74'' for the accommodation of the recesses 74ª and 74ᵇ, the keepers 72ª, 72ᵇ are advantageously spaced narrower than customary, their outer ends at the points 72ᶜ and 72ᵈ lying well within the sides of the outer extension or part 72ᵉ of the post, and in lieu of the usual separate keepers screwed onto the post, they may conveniently be cast into a single piece secured to the post by a bolt passing through the casting and post as shown in Fig. 25. This construction is particularly convenient for a post terminating at or near the top of the front seat back, as in convertibles. It is obvious, however, that if the post extends to the top of the car, the same results may be achieved and the strength of the post at this point increased by merely pressing in the sides of outer part 72ᵉ of the post to a width corresponding to the points 72ᶜ and 72ᵈ and screwing separate keepers on each side thereof, thus retaining the integrity of the post.

The lock members 290 on opposite sides of the car are shown in Figs. 23, 24, and 27 interconnected to operate in synchronism by means of an incompressible fluid transmission comprising pistons 294 rigidly attached to the lock members; cylinders 295, advantageously rigidly attached to the bottom of the casings 291, in which the pistons reciprocate; and fluid transmission tube 296, conveniently having its ends screwed into the bottom of the cylinders and containing an incompressible fluid 296'. The cylinder on one side may be inverted as shown on the left in Fig. 27 in order that motion in the same directions may be imparted to both opposite locking members 290, but it is obvious that if the locking member on the left is itself inverted to operate in the reverse direction to that on the right and is located above the latch, the corresponding cylinder need not be inverted. Springs 296ª are provided to neutralize the effect of gravity and friction on the transmission system, the springs being placed in greater tension in compressed position to give initial impulse to the lock member. This system is quite flexible since it permits motion to be transmitted around curves and bends without appreciable friction, thus enabling the tube 296 to be located in the most convenient positions. Moreover, the number of branches and therefore the number of locks served may be multiplied as desired thus enabling all locks on the car to be operated from a single key.

In Figs. 23, 25, and 26 is shown means to prevent operation of the locks if any of the doors are open, said means comprising a detent 297 pivoted at 297' to the underside of the top 291" of the casing, said detent normally swinging vertically by gravity in the path of the lock member 290. The detent is provided with a beveled top 297" passing through a slot in the casing top into the path of the similarly beveled latch 74" so that when the latter moves behind its keeper 72$^b$, the detent will be cammed by engagement of the respective beveled surfaces out of the path of the lock member 290. Since each latch is provided with a corresponding detent, it is obvious that if any one (or more) door is unlatched, its detent will not be lifted and the entire interconnected system will be prevented from operating until all doors are closed.

While I have shown a gravity detent in Figs. 23, 25, and 26, it is obvious that any other latch or door-controlled detent such as a spring biased detent or other preventive means may be employed to block the paths of any of the locks disclosed herein until all the doors are properly closed.

In the operation of the system of Figs. 23 to 27, if all of the doors are closed and the detents 297, accordingly, moved by the latches out of the paths of the lock members 290, as shown at the left in Fig. 23, a key 293' inserted in key-barrel 293 and turned clockwise will operate the key shaft 292 and cam 292' to move the latter from its seat 290$^a$ and into engagement with the seat 290$^b$, imparting a limited motion to the lock member 290 until the final position in said seat is reached, whereupon the bolts 290' will have moved into engagement with the recess 74$^a$ and locked the rear doors, while the bolts 290", of shorter length, will not yet have reached the recesses 74$^b$ to lock the front doors. If it is desired to lock the latter also, continued movement of the key in the same direction will further lift lock members 290 until the cam rests in seat 290$^c$ carrying the shorter bolts 290" into engagement with the latch recesses 74$^b$, locking all doors. It will of course be understood from the diagrammatic showing in Fig. 27 that any motion imparted by the key to locking member 290 on the right will be exactly duplicated for the locking member 290 on the left, since the piston displacements on both sides are equal and the incompressible fluid transmits the motion without modification.

The cam member 292' when positioned in one of the seats 290$^a$, 290$^b$, or 290$^c$ maintains the locking member 290 and its bolts in the corresponding position, until moved by the inside handle 292" or by the key on the outer side. However, if desired, yieldable spring detents, for instance similar to those shown in Figs. 1 and 13, may be employed to exactly position the lock member 290 in each of its three critical positions.

This system can also be readily adapted to operation from either side, or within the car, regardless of the point of the previous operation, by replacing the cam member 292' by a removable key, operating directly on the locking member 290, in the manner of the cam member. If desired, the key extension of Fig. 18 can be adapted thereto for this purpose.

It is also obvious that the fluid system of transmission is directly applicable to the locking system of Fig. 7 since all that is required is to connect the racks 237' of the latter figure directly to the positions 294 without inverting the left piston, since the rack 237' on the left in Fig. 7 is itself reversed from the position of the rack on the right and will therefore effect synchronous operation of the locks by the same direction of motion.

In Fig. 28 is shown a lock member 290$^u$ provided with a dovetail groove to receive the tongue of an adjustable lock bolt 290$^v$ whereby the distance between the respective lock bolts may be adjusted. This is of particular utility in adjusting the new lock to old cars with varying widths of posts.

In Fig. 29 is shown a modified form of locking bolt 290$^w$, circular in cross section, and adapted to enter a circular hole 290$^x$ in the bottom of the latch, as shown in dotted lines.

In Fig. 30 is shown a further modification in which the adjacent bolts are combined into a single bolt 290$^y$ of V-shape, flattened at its base, the respective legs taking into relatively shallow partial V-shaped slots 290$^z$ in the bottoms of the adjacent latches. The inclination of these bolt legs and slots prevent catching on the edges of adjacent members.

While for purpose of illustration, I have shown particular forms of transmission mechanisms applied to particular forms of locking mechanisms, it will be obvious that each may be adapted to the other in any combination most suitable to the particular situation.

It will be observed that in all of my systems for automobile doors I have avoided both frictional and gravitational forces in opposition to the small key imposed force. This is highly essential to the key operation of such systems since the presence of weight and friction in a system having a tortuous path and subject to twists, strains, and vibrations, would otherwise render operation impossible. This is accomplished, for instance, in Figs. 1 and 13 by employing rotational motion, only, about frictionless bearings. In Figs. 7 and 27, it is accomplished by balancing one vertically moving element against another moving in the opposite direction. In Fig. 12, it is accomplished by the use of counterbalancing springs 249 which neutralize the weights of the vertically moving members, giving the greatest impetus when the springs are compressed and the inertia of the weights greatest. This construction can also be arranged to operate by balancing an ascending member by a descending member by changing the lever arrangement. These systems are all enclosed and mounted in protecting casings to shield them from distortion, and the vibrations and strains of the vehicle body.

By the expression "mechanical means" I mean to include all such physical means as solids, fluids, etc. commonly known as matter.

By the terms "lock" and "locking mechanism" I wish to distinguish over crude, manually actuated latching systems not adapted to key-, time-, combination-lock or similar operations. Such latching systems are massive, have large inertia, and require manual lever or similar operation which precludes their adaptability to or utility in a locking system of the character necessarily employed in automobiles. Moreover, they are usually each directly operated from a single central manual operating means and the one latching means is not operated by the other, as in a locking system.

It will be obvious that mechanical systems of the character herein described are practicable for vehicular use where electrically controlled systems would not be, for the reason that upon failure of the car battery as frequently occurs, due to accident or otherwise, when it is most desired to lock the car for a long period against intruders, the electrical system would fail. It would also be much more liable to manipulation by a thief.

This application is a continuation in part of my application serial No. 161,179, filed January 14, 1927, now matured into Patent No. 2,049,464, dated August 4, 1936.

In accordance with the requirements of the patent statutes, I have disclosed the best modes contemplated by me of applying the fundamental principles of my invention, but I do not wish to be limited to the particular modes given as illustrative examples but aim to cover all equivalent modes, both as to the combinations and as to the sub-combinations disclosed.

I claim:

1. In a vehicle construction comprising a body having doors on opposite sides, in combination, locks for said doors, at least one of which is adapted to be operated directly from outside the vehicle by a secret lock means, and a rotary shaft connecting said locks to cause the operation of one of the locks to effect a similar operation of the other of said locks.

2. In a vehicle construction comprising a body having doors on opposite sides, in combination, locks for said doors, at least one of which is adapted to be operated directly from outside the vehicle by a secret lock means, and rotary means connecting said locks to cause the operation of one of the locks to effect a similar operation of the other of said locks.

3. In a vehicle construction comprising a vehicle body having doors on opposite sides, in combination, locking mechanisms for said doors; interconnecting means between said locking mechanisms confined to the enclosing structure of the body and permitting free and unobstructed access to the user of the vehicle, said means being operable by actuation of the locking mechanism on one side of the vehicle by a secret lock means to effect operation of the locking mechanism on the other side of the vehicle.

4. In a vehicle construction comprising a vehicle body having two doors on each side, in combination, locking mechanisms for said doors; interconnecting means between said locking mechanisms, confined to the enclosing structure of the body and permitting free and unobstructed access to the user of the vehicle, said means being operable by actuation of the locking mechanism on one side of the vehicle by a secret lock means to effect operation of the locking mechanism on the other side of the vehicle to lock or unlock all of said doors.

5. In a vehicle construction comprising a vehicle body having two doors on each side; locks for said doors; and interconnecting means between said locks to effect their concurrent operation; said locks comprising means which in one position locks one door on each side, in a second position locks two doors on each side, and in a third position unlocks all of said doors.

6. In a vehicle construction comprising a body having doors with their free edges adjacent each other and provided adjacent said free edges with lock engaging means; in combination, a lock mounted in a stationary part of the vehicle adjacent said free edges of said doors, said lock having means controlling its operation, and being provided with means which when said control means is moved to one position locks one of said doors and which when said control means is moved to another position locks both of said doors, and which when said control means is moved to a third position releases both of said doors.

7. In a vehicle construction comprising a body having adjacent side doors, in combination: locking mechanism provided with locking parts for the respective doors, said locking mechanism having means responsive to operation to one position to cause one of said parts to lock one of said doors, responsive to operation to a second position to cause said parts to lock both of said doors, and responsive to operation to a third position to cause said parts to release both of said doors.

8. In a vehicle construction comprising a body having doors on opposite sides with locking recesses therein, in combination: locks for said doors, each comprising a lock member mounted on a stationary part of the body, adjacent the corresponding door, and adapted when operated to engage a recess in the door to lock the same; and means for connecting the respective members to effect their simultaneous operation from a single point outside the vehicle, at least one of said members being movably mounted transversely to adjust itself to the exact position of its corresponding recess.

9. In a vehicle construction comprising a vehicle body having a door on each side, in combination, locks for the doors; interconnecting power transmitting and synchronizing means between said locks, and means for operating said first mentioned means from the inside or outside of the vehicle, to effect the locking or unlocking of all the doors.

10. In a vehicle construction comprising a vehicle body having a door on each side, in combination, locks for the doors; interconnecting power transmitting and synchronizing means between said locks, and means for operating said first mentioned means from either side of the vehicle, to effect the locking or unlocking of all the doors by said operating means.

11. In a vehicle construction comprising a vehicle body having a door on each side, in combination, locks for the doors; interconnecting power transmitting and synchronizing means between said locks, and means for operating said first mentioned means from any one of a plurality of points about the vehicle, regardless of the point of the preceding operation, to effect the locking or unlocking of all the doors.

12. In a vehicle construction, in combination: a self-contained locking system comprising locks adapted to lock doors on opposite sides of a vehicle and means causing actuation of one of said locks to effect concurrent operation of the other lock, said system being operatively mounted within a continuous casing adapted to be attached to the sides of the vehicle at the points where the locking elements are to be located.

13. In a vehicle body construction comprising doors on opposite sides thereof, in combination: lock pockets for said doors and for adjacent stationary parts of the car body, said pockets on each side being in communication with each other; a rotary shaft passing from one side of the car to the other and provided at its ends, with arms which in one position lie only in the pockets in the stationary parts and in another position, in all pockets, to effect a locking of all the doors, said shaft being provided at one of its ends, at least, with means whereby it may be operated by a secret lock means.

14. In a vehicle construction comprising a body having adjacent side doors, with their free edges juxtaposed; a lock for said doors comprising pockets adapted to be carried by said doors adjacent said free edges; a pocket adapted to be carried by a stationary part of the car body between said door pockets; and a member mounted for rotation in the pocket for said stationary part and shaped to lie, when in one position, entirely in the pocket of said stationary part; when in another position to lie in said last mentioned pocket and in the pocket of one of said doors; and when in a third position to lie in all three pockets.

15. The combination defined in claim 3 wherein the interconnecting means passes through a passageway through a seat structure.

16. The combination defined in claim 10 in which the operating means on one side of the vehicle is released from said door locks while the operating means on the other side is being operated.

17. In a vehicle construction comprising a vehicle body having doors on opposite sides, in combination, locks for said doors, at least one of which is adapted to be operated from outside the vehicle by a secret lock means, and balanced interconnecting means between said locks to cause the operation of one of said locks to effect a similar operation of the other of said locks, said balanced interconnecting means yielding relatively small forces opposing the movements of said interconnecting means.

18. In a vehicle body construction comprising a vehicle body having doors on opposite sides, in combination, locking mechanisms for said doors, operating connections therefor confined to the inclosing structure of said body and permitting unobstructed access to the user of the vehicle, said connections extending from said locking mechanism on one side of the vehicle to that of a door on the opposite side, and means adjacent one of said locking mechanisms operable by a secret lock means for causing the actuation of all of said locking mechanisms either to lock or unlock all of said doors concurrently.

19. The combination defined in claim 27, in which the operating means on each side of the vehicle is normally separated from said door locks, but in which the operating means selected for actuation is first connected to one of said door locks through a secret lock means which actuates it.

RICHARD E. MARINE.